United States Patent

[11] 3,607,689

| | | |
|---|---|---|
| [72] | Inventor | Kiyoshi Inoue<br>100 Sakato, Kawasaki, Kanagawa, Japan |
| [21] | Appl. No. | 750,576 |
| [22] | Filed | Aug. 6, 1968 |
| [45] | Patented | Sept. 21, 1971 |
| [32] | Priority | Oct. 17, 1967, Jan. 17, 1968 |
| [33] | | Japan |
| [31] | | 42/66787 and 43/2519 |

[54] POWER SUPPLY FOR LARGE-SURFACE ELECTROCHEMICAL MACHINING
11 Claims, 8 Drawing Figs.

[52] U.S. Cl. .................................................. 204/143 R, 204/224, 204/228
[51] Int. Cl. ................................................... B23p 1/00, B23p 1/02, B01k 3/00
[50] Field of Search .......................................... 204/143 M, 224, 228; 219/113, 114; 320/1

[56] References Cited
UNITED STATES PATENTS

| | | | |
|---|---|---|---|
| 2,773,168 | 12/1956 | Williams........................ | 320/1 X |
| 3,246,113 | 4/1966 | Scarpelli........................ | 219/113 X |
| 3,259,795 | 7/1966 | Schierholt..................... | 320/1 X |
| 3,328,279 | 6/1967 | Williams et al. ............... | 204/224 X |
| 3,433,728 | 3/1969 | Petroff .......................... | 204/228 X |
| 3,480,537 | 11/1969 | Garnett ......................... | 204/228 X |
| 3,496,088 | 2/1970 | Pfau et al...................... | 204/228 X |

Primary Examiner—John H. Mack
Assistant Examiner—D. R. Valentine
Attorney—Karl F. Ross ABSTRACT: A system for the electrochemical machining of metallic workpieces over large areas in which a storage impedance (e.g. a capacitor) is intermittently charged and discharged via a solid-state controlled rectifier switching circuit to apply periodic unidirectional electrolysis pulses of a current magnitude substantially greater than that of the charging source to the electrode system consisting of a tool electrode and the metallic workpiece while an electrolyte is circulated through the gap therebetween.

INVENTOR
KIYOSHI INOUE
BY Karl F. Ross
ATTORNEY

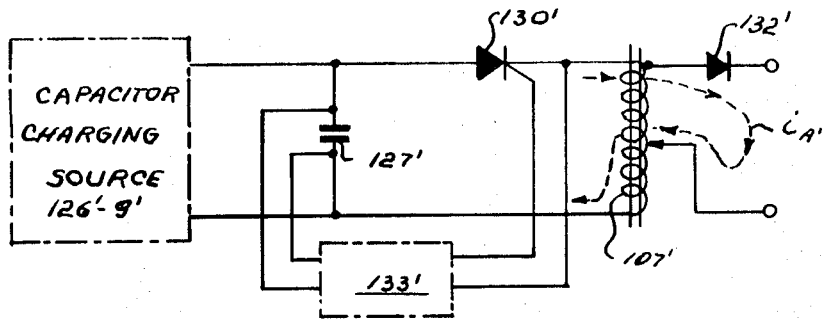
FIG. 2A
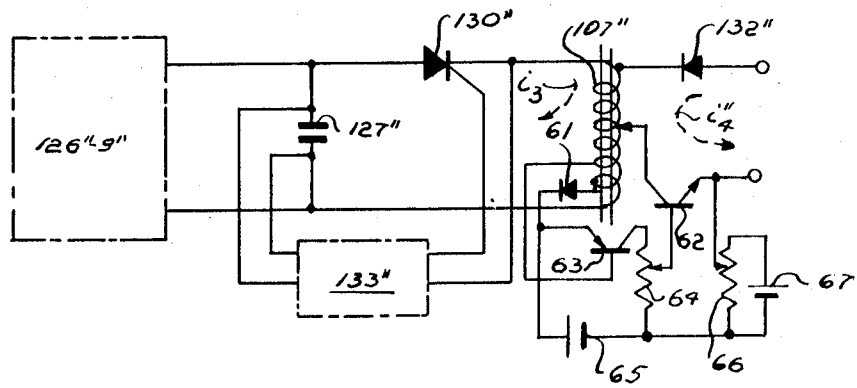
FIG. 2B
FIG. 4
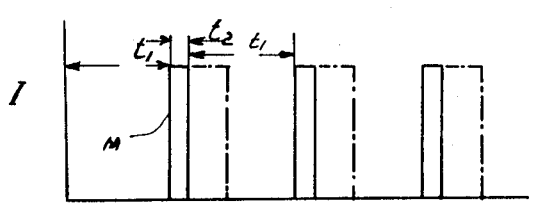
FIG. 5
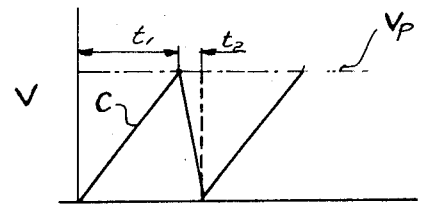
FIG. 2C
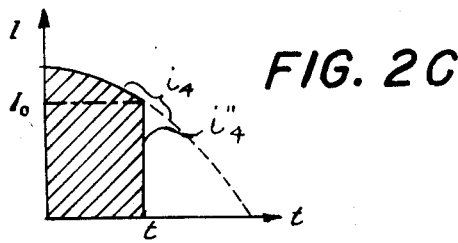

POWER SUPPLY FOR LARGE-SURFACE ELECTROCHEMICAL MACHINING

My present invention relates to a power supply for electrochemical machining (ECM) and, more particularly, to a system capable of supplying the power necessary for such machining over relatively large surface areas.

In my U.S. Pats. Nos. 3,252,881, 3,357,912, 3,371,022 and 3,378,473, as well as my copending applications Ser. No. 511,821, filed Dec. 6, 1965 Pat. No. 3,527,686 No. 452,857, filed July 5, 1966, Pat. No. 3,420,759 No. 565,670 filed June 30, 1966 and No. 598,391 filed Dec. 1, 1966 (now abandoned), I have described principles of electrochemical machining wherein an electrode, which may be contoured to conform to the desired shape of the workpiece, is juxtaposed with the latter across a machining gap flooded with an electrolyte, and an electrolysis current is supplied across the tool electrode and the workpiece electrode and so poled as to electrolytically erode the workpiece and solubilize the eroded substances in the electrolyte. As noted in some of the aforementioned applications, the machining operation is facilitated by eliminating an higher ion barrier or polarization effects by periodically reversing polarity.

When the method is used for the machining of large surfaces, problems arise from the fact that the order of magnitude of the current density necessary for electrolytic removal of workpiece material is 30 amp./cm$^2$. In high-rate applications, current density is of 100–300amp./cm.$^2$. Thus, it will be apparent that, when electrochemical machining of surfaces having areas of about 1 m.$^2$ are to be machined, the total current at normal machining rates is $3\times10^5$amperes, and higher machining rates can required from $1\times10^6$ to $3\times10^6$amperes. Conventional apparatus for carrying out electrochemcial machining of a workpiece generally comprise a line source of alternating current, a stepdown transformer and a rectifier bank interposed between the output or secondary winding of the transformer and the electrode. When continuous DC is desired at normal machining levels of 2 to 20 volts, for example, the transformer may require a power rating of 600 to 6000 kva., such ratings being impractical in installations outside electric power plants or their environments. As a consequence, high-surface-area machining by electrochemical action has been restricted and efforts to apply electrochemical machining to the shaping of large-surface areas have been fruitless.

It is, therefore, the principal object of the present invention to provide an improved power supply system for the electrochemical machining of a metallic workpiece which can be carried out over large surface areas and/or which may use power-supply components of relatively low power rating.

Another object of this invention is to provide an improved system for the electrochemical machining of metallic workpieces.

These objects and others which will become apparent hereinafter are attained in accordance with the present invention, by providing a power source for an electrochemical machining installation, comprising a tool or machining electrode juxtaposable with a metallic workpiece and means for circulating an electrolyte through the machining gap, the improved power supply including a relatively low-power-rating source delivering unidirectional current to a high-capacitance condenser or bank of condensers and means for periodically and unidirectionally discharging the capacitor across the machining gap, the pulses providing a current density for the pulse duration of the order of magnitude previously mentioned. Surprisingly, I have found that electrochemical machining can be effected without detriment to the accuracy of the process with a relatively small power source by applying the machining current in the form of spaced-apart pulses of sufficient magnitude that the current density reaches a level of tens to hundreds of amp./cm.$^2$ only during the flow of the current surge. Heretofore, it has been substantially uniformly believed that continuous flow of the machining current with a mean current density of the latter magnitude was required to ensure electrolytic erosion over the full area of the tool electrode.

According to a more specific feature of this invention, the apparatus comprises a power supply having a large-capacitance condenser bank and the electrode system. I have found that best results are obtained when the switching device is a solid-state controlled rectifier (e.g. an SCR) having a triggering circuit responsive to the charge level of the capacitor bank for initiating the discharge of the capacitor through the controlled rectifier upon the attainment of a predetermined charge level, the controlled rectifier being quenched upon draining of the capacitor.

According to another feature of this invention, two or more power supplies of this nature are connected in parallel with one another across the machining electrodes while triggering means is provided to initiate the operation of one of the power-supply networks substantially simultaneously with the decay of the machining pulse of the other whereby alternate pulses of identical polarity are delivered to the machining electrodes in back-to-back relationship so that a substantially continuous current flow is applied across the machining gap. One of the power supplies may be controlled by the voltage detector connected across its capacitor bank while the other power-supply network is triggered by a pulse-flank detector sensing the trailing flank of the previous pulse of the first power supply to initiate the successive pulse of the other power supply. Advantageously, the pulse duration is regulated by each of the triggering circuits.

The above and other objects, features and advantages of the present invention will become more readily apparent from the following description, reference being made to the accompanying drawing in which:

FIG. 2A is a diagram of a circuit similar to that of FIG. 2 but connected so that the autotransformer effect operates as a stepdown between the load and the power supply;

FIG. 2B is a circuit diagram of a system similar to FIG. 2 but provided with a logic circuit adapted to cut off the current flow in the machining portion of the system in the event ionic contamination or machining accuracy is a problem;

FIG. 2C is a graph of the waveform at the electrode system using the circuit of FIG. 2B;

FIG. 4 is a graph of the current pulses delivered to the electrode system in accordance with the principles of the present invention; and FIG. 5 is a graph of the voltage-versus-time relationship detected by the voltage-sensing network.

Figure 1:
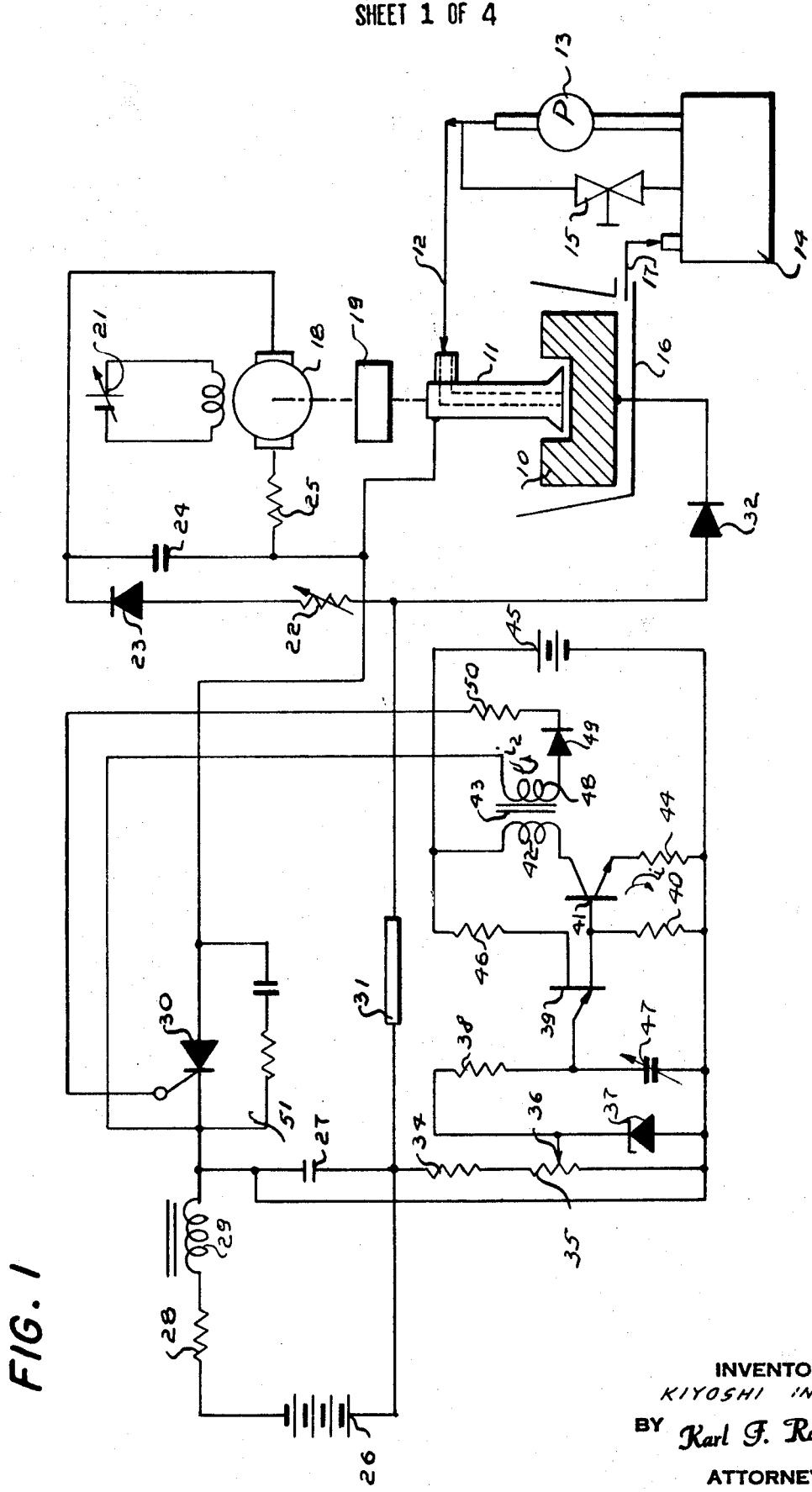
FIG. 1 is a diagram of an apparatus for the electrochemical machining of a workpiece in accordance with the present invention.

In FIG. 1, I show an arrangement for the large-surface electrochemical machining of a workpiece 10 with an electrode 11 which is supplied with electrolyte from a line 12 by a pump 13 drawing the electrolyte from a reservoir 14. A bypass valve 15 returns excess electrolyte to the reservoir. Overflowing electrolyte is collected by the vessel 16 and returned to the reservoir 14 via the line 17. To maintain the machining gap substantially constant as is particularly desirable for the sinking of cavities, I couple a motor 18 with the electrode 11 via a rack-and-pinion or a worm, worm wheel and threaded spindle transmission represented diagrammatically at 19. Details of the electrode control in its vertical movement (arrow 20) can be found in the aforementioned patents and applications. The inputs to the servomotor 18 include the usual adjustable reference 21 and a sensor network comprising a variable resistor 22, a rectifier diode 23 in series therewith and capacitor 24 bridged across the series circuit and tied to the motor 18 via a resistor 25. Thus the servomotor 18 is able to follow changes in the applied voltage across the gap and, consequently, the gap resistance which is proportional to its spacing, and also may be used to shift the electrode pulse by pulse.

The machining-power supply, according to this invention, comprises a low-power source 26, here shown as a battery but usually comprising a line-energized transformer and a rectifier bank, which is designed to charge the capacitor bank 27 through the charging resistance 28 and a surge-suppressing choke 29. Condenser 27 (representing the capacitor bank) has a capacitance such that it is able to deliver pulses of a pulse duration or width of 5 microseconds to about 5 milliseconds with the resulting surge delivering of the order of 10–300 amp./cm.$^2$ to the electrode assembly 10, 11. Choke 29 prevents reverse-current surges during discharge through the source 26. The condenser 27 is connected to the tool electrode 11 in series with the solid state controlled rectifier which is here poled to render the workpiece 10 relatively positive. The other terminal of the condenser 27 is connected in series with an impedance, e.g. a choke or autotransformer represented at 31, and a rectifier 32 designed to limit polarity reversal at the electrodes 10, 11. The triggering circuit 33 is connected to the gate of the controlled rectifier 30 to switch the latter into its conductive state when the charge on the capacitor 27 reaches a predetermined level. The triggering circuit comprises a voltage detector in the form of a voltage divider consisting of resistors 34 and 35, the latter being a potentiometer whose wiper 36 is connected via the Zener diode/variable resistor network 37, 38 to the emitter of a double-base diode or unijunction transistor 39. When the voltage builds up in capacitor 27 to the level determined by the position of the wiper 36 and the rating of the Zener diode 37, the unijunction transistor 39 sustains a current flow through the resistor 40 (arrow $I$), thereby rendering the transistor 41 conductive. The emitter-collector network of this transistor 41 includes the primary winding 42 of an output transformer 43 and a load or bias resistor 44 together with source such as battery 45. A further bias resistor 46 is connected between the positive terminal of the battery 45 and one base of the unijunction transistor 39. Resistors 40 and 44 as well as capacitor 47 are connected to the negative terminal of the battery 45. The unijunction transistor 39 is cut off after a conductive period determined by the time constant of the network 38, 47, 40. The secondary winding 48 of the output transformer is connected via a rectifier 49 and a resistor 50 to the gate of the controlled rectifier 30.

When machining is initiated, the capacitor or capacitor bank 27 is charged by source 26 for a period $t_1$ as represented by the ascending flank C of the graph in FIG. 5 in which the voltage developed at the capacitor is represented along the ordinate as a function of time plotted along the abscissa. When the predetermined voltage level $V_p$, set by the potentiometer 35, 36 is reached, the unijunction transistor 39 is rendered conductive and triggers the amplifying transistor 41 which induces current flow in the direction of arrow $i_2$ and triggers the solid state controlled rectifier 30. During the preceding period (FIG. 4) no current flow through the electrode system 10, 11 was manifested although, upon triggering of the controlled rectifier 30, a square wave machining pulse M is applied across the tool electrode 11 and the workpiece 10 to electrolytically erode the workpiece material. The electrolyte flow during the period may be continuous and, since machining power is delivered during the relatively short interval $t_2$ only, may flow at a reduced rate and yet remove unwanted heat prior to the next machining pulse $M_1$. If the current density required for machining the workpiece is represented as D (in amperes, cm.$^2$), the machining surface as area A (cm.$^2$), the total current $I$ (amperes) necessary for machining the workpiece bay be represented by the relationship $I=D\times A$. With the machining potential of $v$ (volts), the power rating of the source for normal machining operations would be generally represented by the relationship-power rating $=V\times I$ kva. With a suitably dimensioned capacitor bank 27, however, the source requires a power rating $=(t_2/t_1+t_2)\times V\times I$, although the full current $I$ will pass during each pulse. Pulse widths of, say, 1 to 300 milliseconds and preferably 1 to 100 milliseconds give suitable results. After the period $t_2$ determined by the time constant previously mentioned, unijunction transistor 39 becomes nonconductive, thereby deenergizing transistor 41 and terminating the energizing potential at the gate of the controlled rectifier 30. The capacitor discharge through the electrode system 10, 11 and the impedance 31 finally decay to a point that a back pulse is formed by the capacitor-resistor network 51 to sequence the controlled rectifier 30. The servo network 23–25 sequences each surge and may advance the servomotor 18 and the electrode 11 in step with the electrochemical machining of the workpiece 10.

Figure 2:
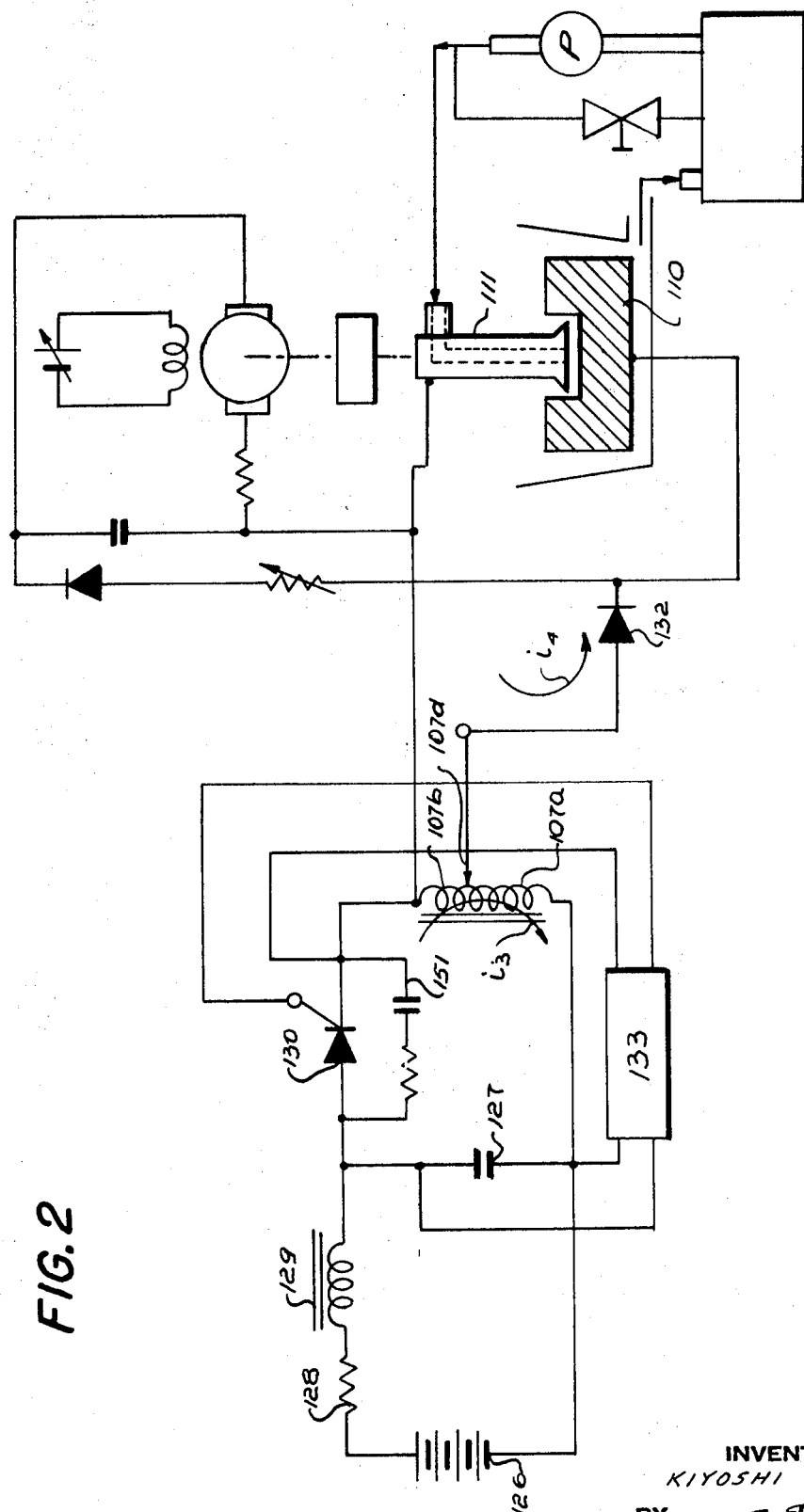
FIG. 2 is a circuit diagram of an apparatus in which the power level of the pulses can be adjusted and in which an inductor functions as a secondary energy-storage element according to the present invention.

In FIG. 2, I show another system in which a capacitor bank is charged by the source 126 through a resistor 128 and the choke 129. The discharge of the capacitor is triggered by a voltage detecting circuit 133 is connected to the solid-state silicon controlled rectifier 130 whose quenching network 151 can reverse polarity across the controlled 130 to render the same nonconductive once the energizing potential has been removed from its gate. In this circuit, I provide an inductive impedance 107 in series with the capacitor 127 and the controlled rectifier 130 in the form of a secondary energy-storage element. The operation of an inductance as an energy-storage element has long been know and is here exploited to deliver a pulse to the electrode-workpiece assembly. The main winding 107a of this impedance is connected in the capacitor discharge circuit mentioned earlier while a wiper 107d taps a portion of this winding to deliver a current pulse represented at $i_4$ in FIG. 2C and by the arrow $i_4$ in FIG. 2, to the workpiece through a rectifier 132, the return being via the tool electrode 111.

When the controlled rectifier 130 is triggered, the current flow in the main power circuit is as represented by the arrow $i_3$ to store energy in the core of the inductance 107. Upon decay of the discharge and the subsequent blocking of the controlled rectifier 130, the inductance 107 "discharges" to deliver the current pulse $i_4$ to the machining system via the rectifier 132.

In FIG. 2A, I have shown a generally similar circuit wherein, however, the rectifier diode 132' is connected differently so that the inductive impedance 107' constitutes a simple stepdown autotransformer. In this arrangement, the capacitior 137' is charged from the source described in connection with FIGS. 1 and 2 and represented at 126'126'–9' while the discharge is triggered by the voltage detecting network 133' by a pulse delivered to the gate of the controlled rectifier 130'. The resulting current flow is shown by the broken line arrow $i_4$' and traverses the rectifier diode 132', the workpiece and the electrode prior to return to the tap 107d' of the autotransformer 107. In this circuit, the diode 132' permits the output of the autotransformer to function concurrently with the discharge and thereby obviates energy storage in the inductance 107'. In the system of FIG. 2, however, the diode 132 is poled to block current flow in the direction represented at $i_4$' and thus allows the inductance to store the energy delivered by the capacitor 127.

It has been found that use of the system of FIG. 2 under some circumstances renders desirable the termination or damping of the current flow during the terminal part of each pulse. This desire arises from the recognition that as the current falls below a level represented, for example, by $I_0$FIG. 2C) machining accuracy decreases and ionic contamination increases. Accordingly, I have found it to be advantageous to provide in a circuit of the type shown in FIG. 2, a detector for sensing the amplitude of the current and a logic circuit designed to sense the discharge current and a logic circuit designed to sense the discharge current and operate a switching device in the discharge circuit if the energy-storage inductance to cut off the machining pulse and render its waveform substantially square. Such an arrangement is illustrated In FIG. 2B.

The capacitor-charging source 126"–9" of the circuit of FIG. 2B charges the capacitor 127" in the nonconductive state of the controlled nonconductive 130″ as previously described. In this circuit, as in those of FIGS. 1, 2, and 2A, a voltage-detecting network 133″ triggers the conductive state of the controlled rectifier 130″. The discharge of capacitor 127″ charge the secondary energy-storage transformer 107″ during the current pulse $i_3$ as previously discussed. A rectifier 61 in the sensing network renders the logic circuit 60 ineffective during this period. When the controlled rectifier 130″ becomes nonconductive (note that a quenching network such as that shown at 151 in FIG. 2 may be used with both the circuit of FIG. 2A and that of FIG. 2B), the secondary energy-storage impedance 107″ discharges (pulse $i_4$) through a transistor switch 62, the workpiece, the electrode and the diode 132″ here poled as described with respect to the circuit of FIG. 2;

The logic circuit 60 includes a transistor 63 whose base-emitter network is connected via the diode 61 to respective taps of the transformer 107″ so that this 63 is rendered conductive when the sensed current tapers off below the level $I_0$ (FIG. 2C) thereby blocking transistor 62. The base of the latter is connected to a potentiometer 64 in the collector-emitter network of transistor 63 in series with a biasing battery 65. The potentiometer 64 thus functions as a voltage divider whose signal is applied to the base by comparison with a reference signal derived from the voltage-dividing potentiometer 66 bridged across the reference-voltage battery 67 and connected to the emitter of transistor 62. The emitter-electrode network of this transistor is in series with the workpiece/electrode assembly and the discharge circuit. During the solid-line portion of the discharge pulse $i_4$ produced by the impedance 107″, the transistor 62 is held in its conductive state by transistor 63. When the current level declines at $t_0$, the logic circuit blocks transistor 62 to cut off the current pulse as represented at $i_4$ in FIG. 2C. The machining pulse thus has the substantially square waveform shown in solid lines in FIG. 2C.

Figure 3:
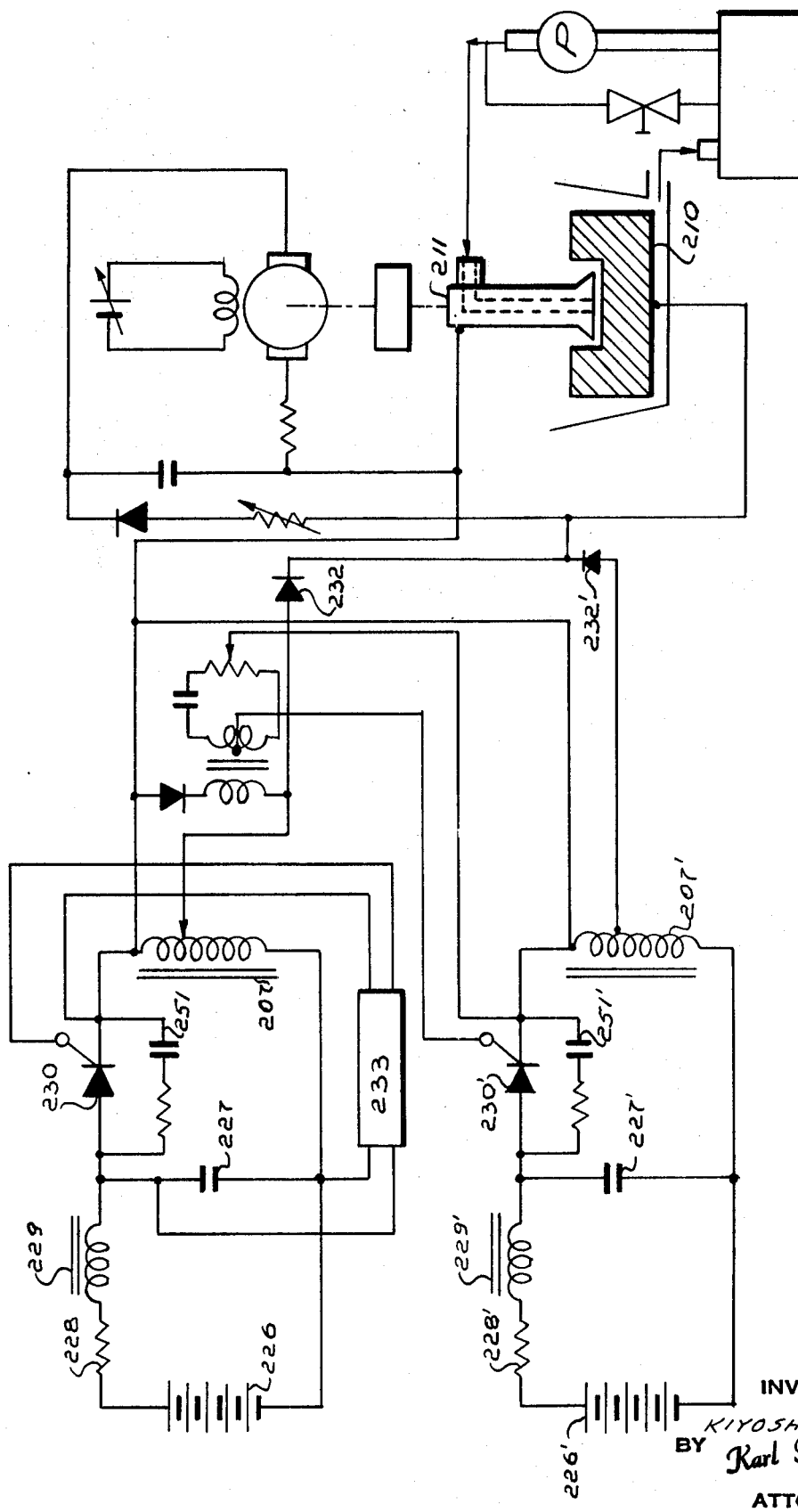
FIG. 3 is a diagram of the system according to this invention using two power-supply circuits.

Still another arrangement is illustrated in FIG. 3. In this system, a first condenser bank 227 is energized by the low power source 226 via the resistor 228 and a choke 229 and can discharge through the controlled rectifier 230 whose gate is triggered by the timing circuit 233 responsive to the level of charge at the capacitor 227. Here again, a quenching network is represented at 250. The autotransformer 207 is connected, as described earlier, to the workpiece via the rectifier 232 and to the tool electrode 211. Consequently, this circuit provides pulses such as are represented at M and M′ in FIG. 4. One or more additional power circuits may be provided to supply back-to-back pulses $m$ and $m'$ FIG. 4), such additional circuits each being connected in parallel with the first-mentioned circuit. Typical of this parallel-connected further circuit is the arrangement of FIG. 3 which includes a low-power DC source 226′ adapted to charge a capacitor bank 227′ via a resistor 228′ and a surge-suppressing choke 229′. The capacitor 227′ discharges when the controlled rectifier 230′, whose quenching circuit is shown at 251′, is rendered conductive. The resulting current surge through autotransformer 207′ gives rise to an output connected via rectifier 232′ in parallel to that of autotransformer 207 across the workpiece 210 and the tool electrode 211.

EXAMPLE I

Using the system illustrated in FIG. 2, with a power source 126 of 30 kva. a capacitor 127 having a capacity of 6000 microfarad and a charging level of 1000 volts and a transformer 107 having a turn ratio of input to output of 100:1 a workpiece of S55C carbon steel was machined over a surface area of 1 m.$^2$ with a resulting density of machining current delivered of approximately 30 amp./cm.$^2$ (total current of 300,000 amperes) and using a 15 percent aqueous solution of potassium nitrate as the electrolyte. The electrolyte pressure was 0.1 to 1 kg./cm.$^2$ the machining rate was about 0.03 mm./minute (tool electrode advance) and the surface finish was about 1 1–2 $\mu$H $_{max}$ while an accuracy of ±0.015 mm. was obtained. These values are equivalent to those obtainable with machining using pure direct current. With pure direct current at a current density of 30 amp./cm.$^2$, the machining rate is about 1mm./minute although a source able to deliver 300,000 amperes is required. In the method of the present invention, a pulse width of 1 millisecond at a frequency of 10 cycles/second was employed. EXAMPLE II Using the system and parameters similar to those of Example II but with a source 126 of 300 kva., a machining rate of 0.3 mm./minute was obtained for a surface area of 1 m$^2$. This indicates also that the power supply is available for the machining over 10 m.$^2$ surface area with 0.03 mm./minute machining rate.

EXAMPLE III

With the system of FIG. 3 and the parameters set forth in Example I, the provision of two power-supply networks applying a pulse train with back-to-back pulses M, $m$, M′, $m'$(FIG. 4), the machining rate was doubled to about 0.60 mm./minute.

The invention described and illustrated is believed to admit of many modifications within the ability of persons skilled in the art, all such modifications being considered within the spirit and scope of the appended claims.

I claim:
1. A system for the electrochemical machining of a metallic workpiece constituting a first electrode, comprising:
   a second electrochemical machining electrode spacedly juxtaposed with said first electrode across a machining gap;
   means for circulating an electrolyte through said gap; and
   power-supply means connected across said electrodes for passing therethrough a substantially unidirectional electric current poled electrolytically to erode material from the workpiece into the electrolyte, said power-supply means comprising:
   a unidirectional source of relatively low current-delivery capacity,
   a current-storage condenser connectable across said source for intermittent charging the thereby and adapted to deliver intermittent current pulses of an amplitude substantially greater than the current-delivery capacity of said source.
   switch means connected in circuit with said current-storage condenser and said electrodes and triggerable to intermittently discharge the current stored in said current-storage condenser through said electrodes, and
   triggering means connected to said switch means for operating same to charge said current-storage condenser for the duration of a charging interval and discharge said current-storage condenser for the duration of a machining interval thereby electrically machining said workpiece during said intervals with a current density greater than can be drawn from said source.
2. The system defined in claim 1 wherein said switch means is a solid-state controlled rectifier having an anode and cathode in circuit with said condenser and said electrodes, and a gate tied to said triggering means.
3. The system defined in claim 2 wherein said source includes a direct-current source and a surge-suppressing choke connected in series with said condenser.
4. The system defined in claim 2, further comprising a quenching network connected across the anode and cathode of said controlled rectifier, said power-supply means further comprising an inductance connected in series with said condenser and the anode and cathode of said controlled rectifier, and a rectifying diode connected in series with said electrodes.
5. The system defined in claim 2 wherein said power-supply means includes a stepdown transformer having an input connected in series with said controlled rectifier and said condenser, and an output connected in series with said electrodes.
6. The system defined in claim 5, further comprising a rectifying diode in series with the output of said stepdown transformer and said electrodes.

7. The system defined in claim 2 wherein said triggering means includes a charge-level-detecting network connected across said condenser and responsive to the attainment of a predetermined charge level, and transistor-switch means operable by said detector and connected to the gate of said controlled rectifier for triggering same upon the attainment of said predetermined charge level.

8. The system defined in claim 7 wherein said transistor-switch means includes a unijunction transistor having its emitter connected to said detector, an amplifying transistor having its base connected to one of the bases of said unijunction transistor and an emitter-collector network, an output transformer having a primary winding in series with said emitter-collector network, and rectifier means connected in series with the secondary winding of said output transformer and the gate of said controlled rectifier.

9. The system defined in claim 2, further comprising a second power-supply means having a source, a condenser and a controlled rectifier essentially corresponding to those of the first-mentioned power-supply means and connected in parallel therewith to said electrodes for delivering a succession of machining pulses thereto intermediate the machining pulses delivered by said first power-supply means.

10. The system defined in claim 9, further comprising control means responsive to the decay of the machining pulses of said first power-supply means for triggering the controlled rectifier of said second power-supply means to initiate the machining pulses thereof.

11. A method of electrochemically machining a metallic workpiece constituting a first electrode, comprising the steps of spacedly juxtaposing said first electrode with a second electrode across a machining gap; introducing an electrolyte coolant into said gap; intermittently charging a current-storage impedance over relatively long intervals; and intermittently discharging said impedance between said relatively long intervals over relatively short machining intervals across said electrodes to apply therethrough unidirectional machining pulses of a current amplitude substantially above the current amplitude of the charging of said condenser.